June 1, 1937. A. LA R. PARKER 2,082,716
WATER GAUGE
Filed Dec. 30, 1935 2 Sheets-Sheet 1
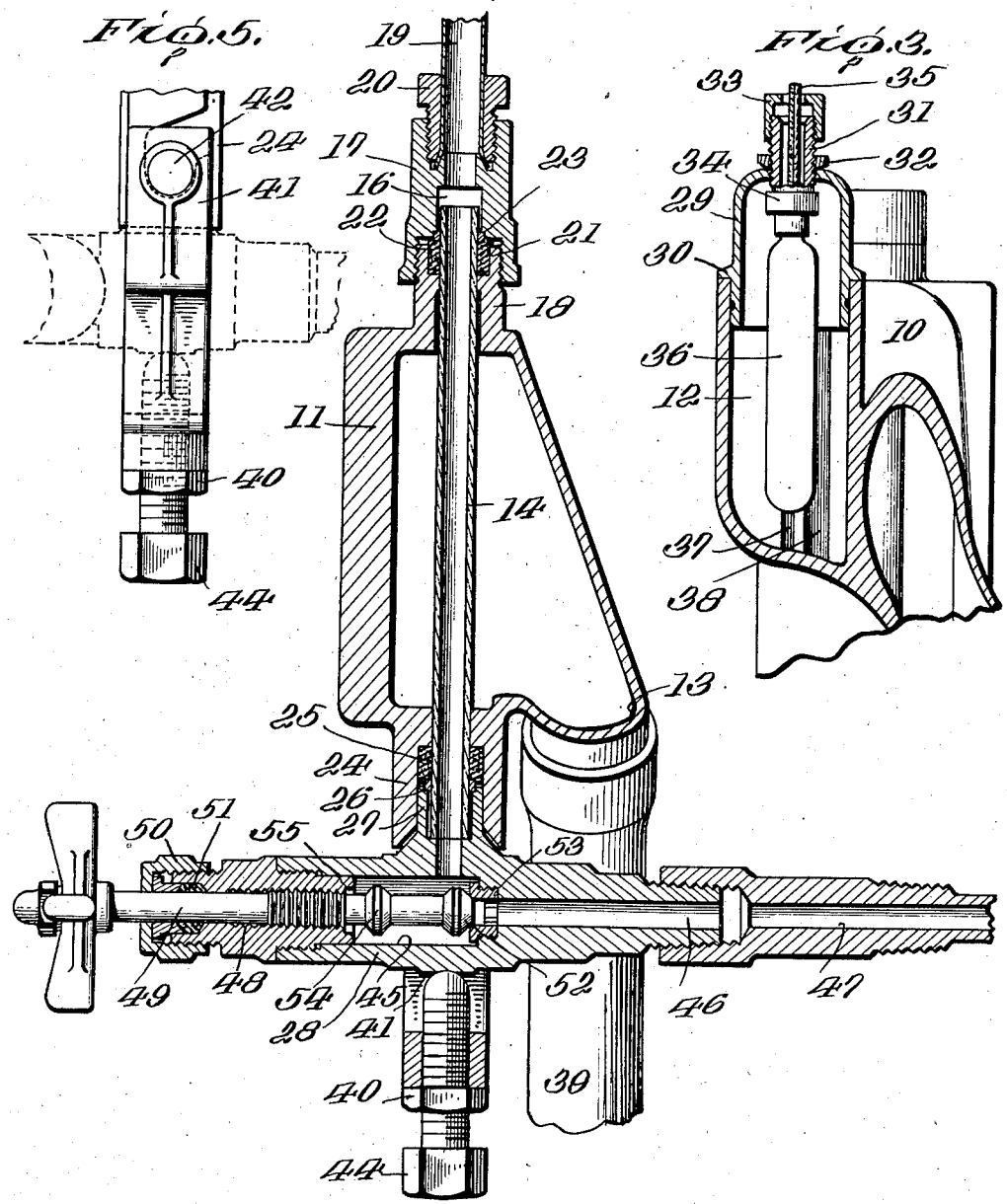
Inventor
Arthur L. Parker
By Mason & Porter
Attorneys June 1, 1937.  A. LA R. PARKER  2,082,716
WATER GAUGE
Filed Dec. 30, 1935  2 Sheets-Sheet 2
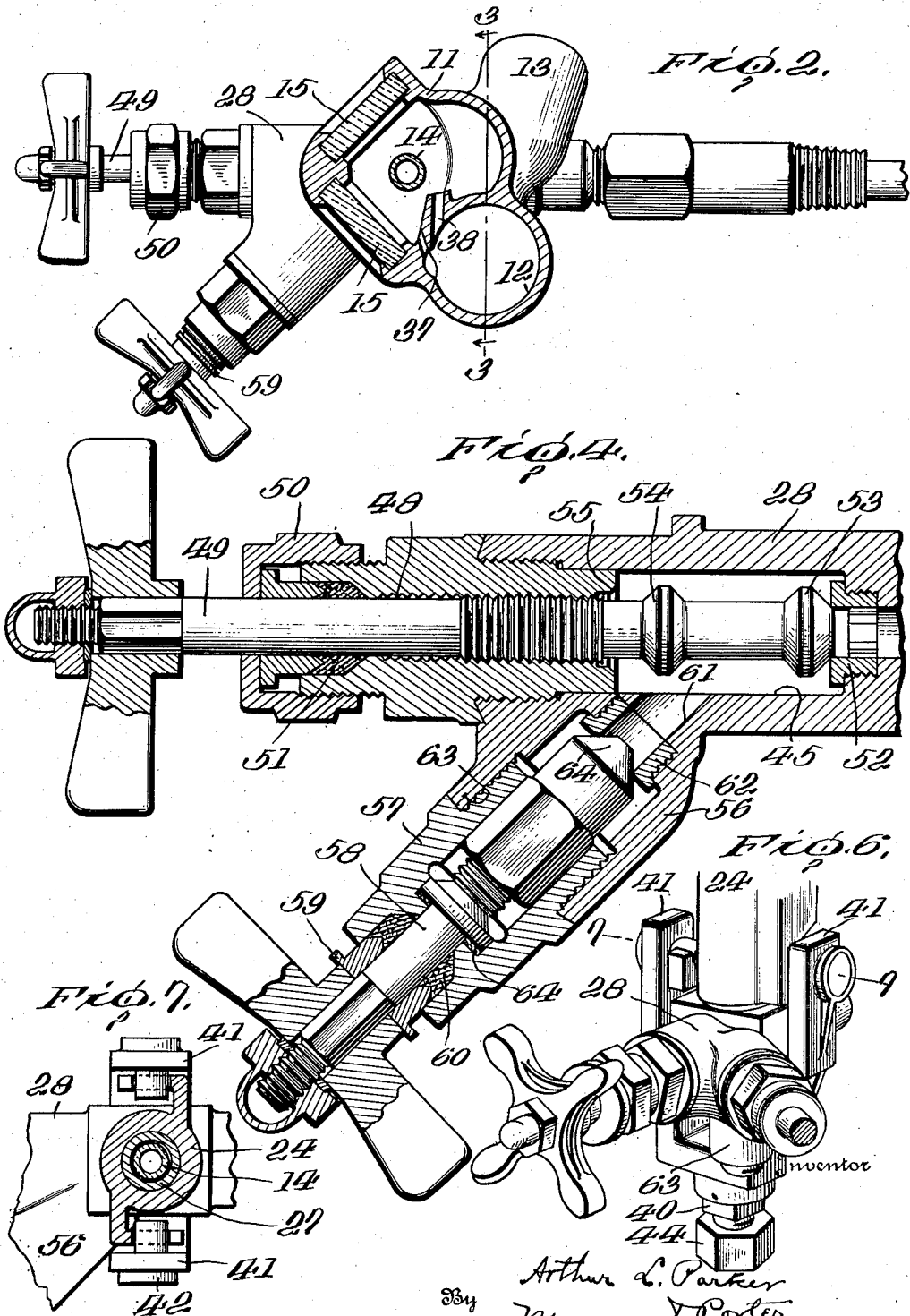
Inventor
Arthur L. Parker
By Mason & Porter
Attorneys Patented June 1, 1937

2,082,716

UNITED STATES PATENT OFFICE 2,082,716

WATER GAUGE

Arthur La Rue Parker, Cleveland, Ohio

Application December 30, 1935, Serial No. 56,788

6 Claims. (Cl. 73—54)

The present invention relates to new and useful improvements in water gauges and more particularly to a water gauge which is provided with a protector casing through which the gauge tube is visible and which is of the type primarily adapted for use in indicating the height of water in a locomotive boiler.

An object of the invention is to provide a water gauge of the above type wherein the protector casing containing the gauge tube is connected to the valve housing and a tight seal produced therebetween without any turning movement of the protector casing relative to the valve housing so that the protector casing and the valve housing may have a predetermined set position relative to the boiler.

A further object of the invention is to provide a water gauge of the above type wherein the protector casing is mounted on the valve housing in a manner which eliminates any threaded connection therebetween.

A further object of the invention is to provide novel means for effecting a tight seal between the protector casing and the valve housing without imposing any stress on the gauge tube.

A further object of the invention is to provide a one-piece protector casing having a chamber for the gauge tube, a separate discharge chamber communicating therewith, and a separate lamp chamber also communicating therewith for illuminating the gauge tube.

The invention still further aims to provide a water gauge of the above type which is simple in construction, inexpensive to manufacture, and efficient in use.

The above and other objects of the invention will in part be obvious and will be hereinafter more fully described.

In the drawings:

Fig. 1 is a side elevation in section showing the manner in which the protector casing, the gauge tube, and the valve housing are connected.

Fig. 2 is a top plan view of the water gauge with the protector casing shown in section.

Fig. 3 is a fragmentary side elevation partly in section showing the lamp chamber and protector casing.

Fig. 4 is a top plan view in section showing the valve mechanism.

Fig. 5 is a detail side elevation showing the means for securing the protector casing to the valve housing.

Fig. 6 is a similar view in perspective.

Fig. 7 is a sectional view taken along the line 7—7 of Fig. 6.

Referring more in detail to the accompanying drawings, and particularly to Figs. 1, 2, and 3, the protector casing 10 is formed in a single casting and includes a central chamber 11, a lamp chamber 12 and a discharge chamber 13. The front walls of the central chamber 11, through which the gauge tube 14 extends, are disposed obliquely to one another and are provided with longitudinal openings which are closed by relatively heavy glass plates 15, through which the gauge tube 14 is visible. The glass tube 14 extends longitudinally through the chamber 11 and into a recess 16 in a coupling member 17 which threadedly engages a neck portion 18 on the protector casing 10 directly above the chamber 11. A pipe 19 connected to the upper portion of the boiler (not shown) is secured to the coupling member 17 by means of a packing nut 20. The upper end of the neck portion 18 is provided with an internal annular recess 21 in which is fitted a gasket 22 surrounding the gauge tube 14. A gasket follower 23 abuts against shoulders on the coupling member 17 and compresses the gasket 22 when the coupling member is screwed on the neck portion 18 so as to afford a tight seal. The protector casing 10 is provided with a depending sleeve portion 24 directly beneath the chamber 11 and in line with the neck portion 18. The gauge tube 14 extends through the chamber 11 and between and spaced from the walls of the sleeve portion 24. Surrounding the gauge tube 14 within the sleeve portion 24 is a gasket 25 which is compressed by a gasket follower 26 which abuts against shoulders on an upstanding neck portion 27 on the housing 28 for the valve mechanism.

The lamp chamber 12 is open at the upper end thereof and is adapted to be closed by a cap member 29 having an annular shoulder 30 abutting against the upper edge of the chamber 12. Threadedly engaging the cap 29 is a connecting nipple 31 which is secured in position by a locking nut 32 and substantially closed by a connector nut 33. A lamp socket 34 is supported within the cap 29 and the wire 35 extends through the nipple 31 and then opening in the connector nut 33. A lamp bulb 36 is carried by the socket 34 and is disposed within the chamber 12. The wall separating the lamp chamber 12 from the chamber 11 is provided with two slots 37, 38, see Figs. 2 and 3. The slot 37 directs light from the bulb 36 across the front of the gauge tube 14 and the slot 38 directs light from the bulb across the back of the gauge tube 14 so that it is visible through the glass plates 15 in the front walls of the chamber 11.

The discharge chamber 13 communicates with the chamber 11 and is provided with an outlet portion which is connected to a discharge pipe 39. The purpose of this discharge chamber and pipe connection 39 is to permit broken glass, steam and hot water to be discharged away from the firemen in the event that the gauge tube 14 is broken during operation.

It is necessary to have the protector casing 10 in a fixed position so that the gauge tube 14 is always visible through the glass plates 15. When a threaded connection is employed between the valve housing 28 and the casing 10, it is impossible to always have the casing 10 in the proper position when it is screwed down to compress the gasket 25 and to afford a tight seal. In other words, when it is necessary to turn the protector casing relative to the valve housing to compress the gasket, there is no assurance that when a tight seal is effected, the glass plates 15 on the casing 10 will be in the proper position for the gauge tube 14 to be seen therethrough. Furthermore, the tightening of the casing 10 on the valve housing in this manner often results in the breaking of the gauge tube 14. According to the present invention, there is no threaded connection employed between the casing 10 and the valve housing 28. Referring to Figs. 5 and 6, a yoke 40 having spaced arms 41 disposed on the outside of the valve housing 28 is connected to the sleeve portion 24 of the protector casing 10. The arms 41 are provided with projecting lugs 42 which engage hooks 43 on the casing 10. A clamping screw 44 extends through the horizontal portion of the yoke 40 and, when tightened, will engage the under side of the valve housing 28. Further turning of the screw 44 will produce a relative movement of the protector casing and the valve housing 28 toward one another, thus causing the neck portion 27 on the valve housing to engage and compress the gasket 25. The valve housing has a tapered portion surrounding the neck portion 27 and the inner end of the sleeve 24 is similarly shaped. The gasket is so dimensioned that the neck portion 27 will firmly compress the same and produce a tight seal between the gasket and the gauge tube 14 before the tapered sections come into contact. The arms 41 of the yoke 40 are restrained against turning movement by the sides of the valve housing 28 so that the positioning of the lugs 42 in the hooks 43 on the casing 10 will properly set the protector casing 10 in its predetermined position. In this manner the casing 10 can be clamped tightly in this position with the gauge tube 14 visible through the glass plates or windows 15 to afford a sealing at the gasket 25 without any turning of the casing relative to the valve housing or to the boiler.

The valve housing 28 is provided with a central chamber 45 which communicates with a port 46. The housing 28 is threadedly connected to a coupling member 47 which extends into the locomotive boiler (not shown). Detachably secured to the valve housing 28 is a member 48 which is adapted to support a valve stem 49. The valve stem 49 extends through the member 48 and is threadedly connected thereto. Threaded on the outer end of the supporting member 48 is a nut 50 of the usual type for compressing a sealing gasket 51 surrounding the valve stem 49. A valve seat 52 is positioned at the point where the port 46 enters the chamber 45. The valve stem 49 carries a valve member 53 which is adapted to control the passage of water from the boiler through the valve seat 52 to the gauge tube 14. The valve stem also carries a secondary valve member 54 which, when the valve 53 is completely opened, will engage a valve seat 55 on the member 48 to prevent any leakage around the valve stem.

The valve housing 28 is provided with an integral angular extension 56. A supporting member 57 threadedly engages the extension 56 and is adapted to support a valve stem 58. The valve stem 58 extends through the member 57 and threadedly engages a valve member 64 which is restrained against turning movement within the supporting member 57. Splined on the outer end of the member 57 is a nut 59 for compressing a sealing gasket 60 around the valve stem 58. The extension 56 is provided with a port 61 communicating with the central chamber 45 in the valve housing 28. The port 61 terminates in a valve seat 62 with which the valve member 64 cooperates. The extension 56 is provided with a draining opening 63. Turning of the valve stem 58 will effect, through its threaded engagement with the valve member 64, a relative movement of the said valve member toward and away from the valve seat 62 to control the passage from the port 61 to the opening 63. Between shoulders on member 57 and stem 58 is a gasket 64.

When the valve 53 is opened, water from the boiler will pass through the chamber 45 in the valve housing and up into the gauge tube 14 so that the height of water in the boiler may be determined by looking through the glass plates 15 in the casing 10. The gauge tube 14 is illuminated by the lamp 34 in the lamp chamber 12. If for any reason, such as the breaking of the gauge tube 14, it is desired to cut off the supply of water from the boiler, the valve 53 may be closed. The valve 64 is of course kept closed at all times to prevent leakage through the opening 63 during operation of the device. When, however, it is necessary or desirable to drain water remaining in the gauge tube 14 when the valve 53 is closed, the valve 64 may be opened to permit the water to drain out through the opening 63.

It is obvious that minor changes in the details of construction and arrangement of parts may be made without departing from the scope of the invention as set forth in the appended claims.

I claim:

1. A water gauge for boilers comprising a valve housing adapted to be connected to the boiler in a fixed position relative thereto, an enclosed casing adapted to be connected to said housing in a predetermined set position for observation, said casing having a chamber provided with a window, a gauge tube located in said chamber and visible through said window, sealing means disposed between said casing and said housing, hook means on said casing, a yoke extending under said housing and having the arms thereof engaging with said hook means, and means carried by said yoke and engageable with said housing in axial alignment with said gauge tube for causing a relative movement between said housing and said casing for effecting a tight seal therebetween while maintaining said casing in the predetermined set position for observation.

2. A water gauge for boilers comprising a valve housing adapted to be connected to the boiler in a fixed position relative thereto, an enclosed one-piece casing adapted to be connected to said housing in a predetermined set position for observation, said casing having a chamber in which the gauge tube is located, said chamber having a pair of windows obliquely disposed with respect to one another and substantially meeting at the front of said chamber, said casing having a lamp chamber disposed in rear of the gauge tube chamber, the wall between said lamp chamber and the gauge tube chamber having a pair of slots therethrough, one of said slots adapted to direct light in front of the gauge tube and the other of said slots adapted to direct light in rear of the gauge tube, sealing means disposed between said casing and said housing, and means for causing a relative movement between said casing and said housing for effecting a tight seal therebetween while maintaining said casing in the predetermined set position for observation.

3. A water gauge for boilers comprising a valve housing adapted to be connected to the boiler, an enclosed one-piece casing connected to said housing, said casing having a chamber provided with a pair of windows obliquely disposed with respect to one another and substantially meeting at the front of said chamber, a gauge tube extending through said chamber and visible through the windows therein, a lamp chamber formed as an integral part of said casing and disposed in rear of and at one side of the gauge tube chamber, the wall between said lamp chamber and the gauge tube chamber having a pair of slots therethrough, one of said slots adapted to direct light in front of said gauge tube and the other of said slots adapted to direct light in rear of said gauge tube whereby to illuminate the gauge tube and render it visible through said windows.

4. A water gauge for boilers comprising a valve housing adapted to be connected to the boiler in a fixed position relative thereto, an enclosed casing adapted to be connected to said valve housing in a predetermined set position for observation, said casing having a chamber provided with a window, a gauge tube located in said chamber and visible through said window, sealing means disposed between said casing and said housing, and means connected to said casing directly above said valve housing and engageable with the opposite side of said valve housing in axial alignment with said gauge tube for causing relative movement between said valve housing and said casing to effect a tight seal without causing relative rotation therebetween.

5. A water gauge, as claimed in claim 4, wherein the sealing means includes a neck portion on the valve housing adapted to receive one end of the gauge tube, an integral sleeve on said casing surrounding said gauge tube and said neck portion on the valve housing, and a gasket disposed within the integral sleeve on said casing and adjacent the end of the neck portion on said valve housing.

6. A water gauge for boilers comprising a valve housing adapted to be connected to the boiler in fixed position relative thereto, said valve housing having angular extensions receiving valve stems, an enclosed casing adapted to be connected to said valve housing in a predetermined set position for observation, said casing having a chamber provided with a window, a gauge tube located in said chamber and visible through said window, sealing means disposed between said casing and said valve housing, a yoke having the arms thereof connected to said casing directly above said valve housing, said angular extensions on said valve housing being disposed at one side of the axial line of said gauge tube, and screw means carried by said yoke and engageable with the opposite side of said valve housing in axial alignment with said gauge tube for causing relative movement between said valve housing and said casing to effect a tight seal without causing relative rotation therebetween.

ARTHUR LA RUE PARKER.